(12) United States Patent
Hyun et al.

(10) Patent No.: US 11,418,696 B2
(45) Date of Patent: Aug. 16, 2022

(54) OPTICAL DEVICE

(71) Applicant: LG ELECTRONICS INC., Seoul (KR)

(72) Inventors: Jeeho Hyun, Seoul (KR); Sungmin Woo, Seoul (KR); Gunshik Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 122 days.

(21) Appl. No.: 16/981,340

(22) PCT Filed: Oct. 16, 2018

(86) PCT No.: PCT/KR2018/012199
§ 371 (c)(1),
(2) Date: Sep. 16, 2020

(87) PCT Pub. No.: WO2019/177218
PCT Pub. Date: Sep. 19, 2019

(65) Prior Publication Data
US 2021/0014428 A1      Jan. 14, 2021

Related U.S. Application Data

(60) Provisional application No. 62/643,771, filed on Mar. 16, 2018.

(51) Int. Cl.
*H04N 5/232* (2006.01)
*G02F 1/29* (2006.01)
(Continued)

(52) U.S. Cl.
CPC ......... *H04N 5/232122* (2018.08); *G02B 3/14* (2013.01); *G02B 7/04* (2013.01);
(Continued)

(58) Field of Classification Search
CPC ....... H04N 5/232122; H04N 5/232935; H04N 5/232123; H04N 5/2253; H04N 5/2254;
(Continued)

(56) References Cited

U.S. PATENT DOCUMENTS 7,324,287 B1     1/2008   Gollier
9,128,350 B1 *   9/2015   Lee .......................... G03B 9/02
(Continued)

FOREIGN PATENT DOCUMENTS

EP    2996352    3/2016
EP    3255491    12/2017
(Continued)

OTHER PUBLICATIONS

Schuhladen, "Miniaturized tunable apertures", Research in Micro-optics, vol. 20, XP055438238, http://d-nb.info/1119452724/34, Jan. 2016, 178 pages.
(Continued)

*Primary Examiner* — Timothy J Henn
*Assistant Examiner* — Fayez A Bhuiyan
(74) *Attorney, Agent, or Firm* — Lee, Hong, Degerman, Kang & Waimey PC

(57) ABSTRACT

In order to effectively perform auto focusing and an OIS function, provided is an optical device in a first diopter state, the optical device comprising: a liquid lens having a variable diopter; a memory in which regions of interest (ROIs) according to the variable diopter are recorded; a lens control unit for retrieving a first ROI corresponding to the first diopter from the memory and configuring the first ROI; and a diopter operating unit for auto-focusing the first ROI to change the liquid lens to have a second diopter.

13 Claims, 15 Drawing Sheets

(51) Int. Cl.
    *G02B 3/14*    (2006.01)
    *G02B 7/04*    (2021.01)
    *G02B 26/00*    (2006.01)
    *G06F 3/041*    (2006.01)
    *H04N 5/225*    (2006.01)
    *G02B 7/09*    (2021.01)
    *H04M 1/02*    (2006.01)

(52) U.S. Cl.
    CPC ............ *G02B 7/09* (2013.01); *G02B 26/004* (2013.01); *G02B 26/005* (2013.01); *G02F 1/29* (2013.01); *G06F 3/041* (2013.01); *H04M 1/0264* (2013.01); *H04N 5/2253* (2013.01); *H04N 5/2254* (2013.01); *H04N 5/23264* (2013.01); *H04N 5/232123* (2018.08); *H04N 5/232935* (2018.08); *G02F 1/294* (2021.01)

(58) Field of Classification Search
    CPC ........ H04N 5/23264; G02B 3/14; G02B 7/04; G02B 7/09; G02B 26/004; G02B 26/005; G02F 1/29; G02F 1/294; G06F 3/041; H04M 1/0264
    See application file for complete search history.

(56) References Cited

U.S. PATENT DOCUMENTS

| | | | |
|---|---|---|---|
| 9,690,160 B2* | 6/2017 | Ye | G02F 1/29 |
| 9,910,246 B2 | 3/2018 | Zohrabyan et al. | |
| 10,268,036 B1 | 4/2019 | Schultz et al. | |
| 2009/0072037 A1 | 3/2009 | Good et al. | |
| 2009/0171620 A1 | 7/2009 | Addy | |
| 2009/0213321 A1* | 8/2009 | Galstian | G02B 3/14 |
| | | | 349/200 |
| 2009/0302197 A1 | 12/2009 | Uchino et al. | |
| 2010/0254021 A1 | 10/2010 | Yoshida et al. | |
| 2010/0295987 A1 | 11/2010 | Berge | |
| 2012/0013760 A1 | 1/2012 | Parodi-Keravec et al. | |
| 2012/0140167 A1 | 6/2012 | Blum | |
| 2013/0128223 A1 | 5/2013 | Wood et al. | |
| 2013/0306480 A1 | 11/2013 | Chang et al. | |
| 2014/0191107 A1 | 7/2014 | Lee et al. | |
| 2015/0085173 A1 | 3/2015 | Chun et al. | |
| 2015/0223669 A1 | 8/2015 | Goldfain et al. | |
| 2016/0360121 A1 | 12/2016 | Cheng et al. | |
| 2017/0094210 A1 | 3/2017 | Galor Gluskin | |
| 2019/0279354 A1 | 9/2019 | Inazumi et al. | |

FOREIGN PATENT DOCUMENTS

| | | |
|---|---|---|
| JP | 2012128029 | 7/2012 |
| JP | 2014186227 | 10/2014 |
| JP | 2015108712 | 6/2015 |
| KR | 100835108 | 6/2008 |
| KR | 1020090018579 | 2/2009 |
| KR | 1020140008699 | 1/2014 |
| KR | 1020140089852 | 7/2014 |
| KR | 1020140111062 | 9/2014 |
| KR | 1020150100394 | 9/2015 |
| KR | 1020150113538 | 10/2015 |
| KR | 1020160074658 | 6/2016 |
| KR | 1020170067634 | 6/2017 |
| KR | 1020170139982 | 12/2017 |
| KR | 101821189 | 1/2018 |
| WO | 2017188798 | 11/2017 |

OTHER PUBLICATIONS

European Patent Office Application Serial No. 18910169.4, Search Report dated Nov. 30, 2021, 6 pages.

European Patent Office Application Serial No. 18909706.6, Search Report dated Dec. 6, 2021, 10 pages.

European Patent Office Application Serial No. 18909504.5, Search Report dated Dec. 7, 2021, 12 pages.

United States Patent and Trademark Office U.S. Appl. No. 16/981,641, Notice of Allowance dated Dec. 29, 2021, 17 pages.

PCT International Application No. PCT/KR2018/012205, Notification of Transmittal of The International Search Report and the Written Opinion of the International Searching Authority, or Declaration dated Feb. 7, 2019, 10 pages.

PCT International Application No. PCT/KR2018/012199, Notification of Transmittal of The International Search Report and the Written Opinion of the International Searching Authority, or Declaration dated Feb. 14, 2019, 11 pages.

PCT International Application No. PCT/KR2018/012195, Notification of Transmittal of The International Search Report and the Written Opinion of the International Searching Authority, or Declaration dated Jan. 22, 2019, 11 pages.

PCT International Application No. PCT/KR2018/012207, Notification of Transmittal of The International Search Report and the Written Opinion of the International Searching Authority, or Declaration dated Jan. 31, 2019, 13 pages.

United States Patent and Trademark Office U.S. Appl. No. 16/981,335, Office Action dated Mar. 31, 2022, 14 pages.

\* cited by examiner

[FIG. 1a]
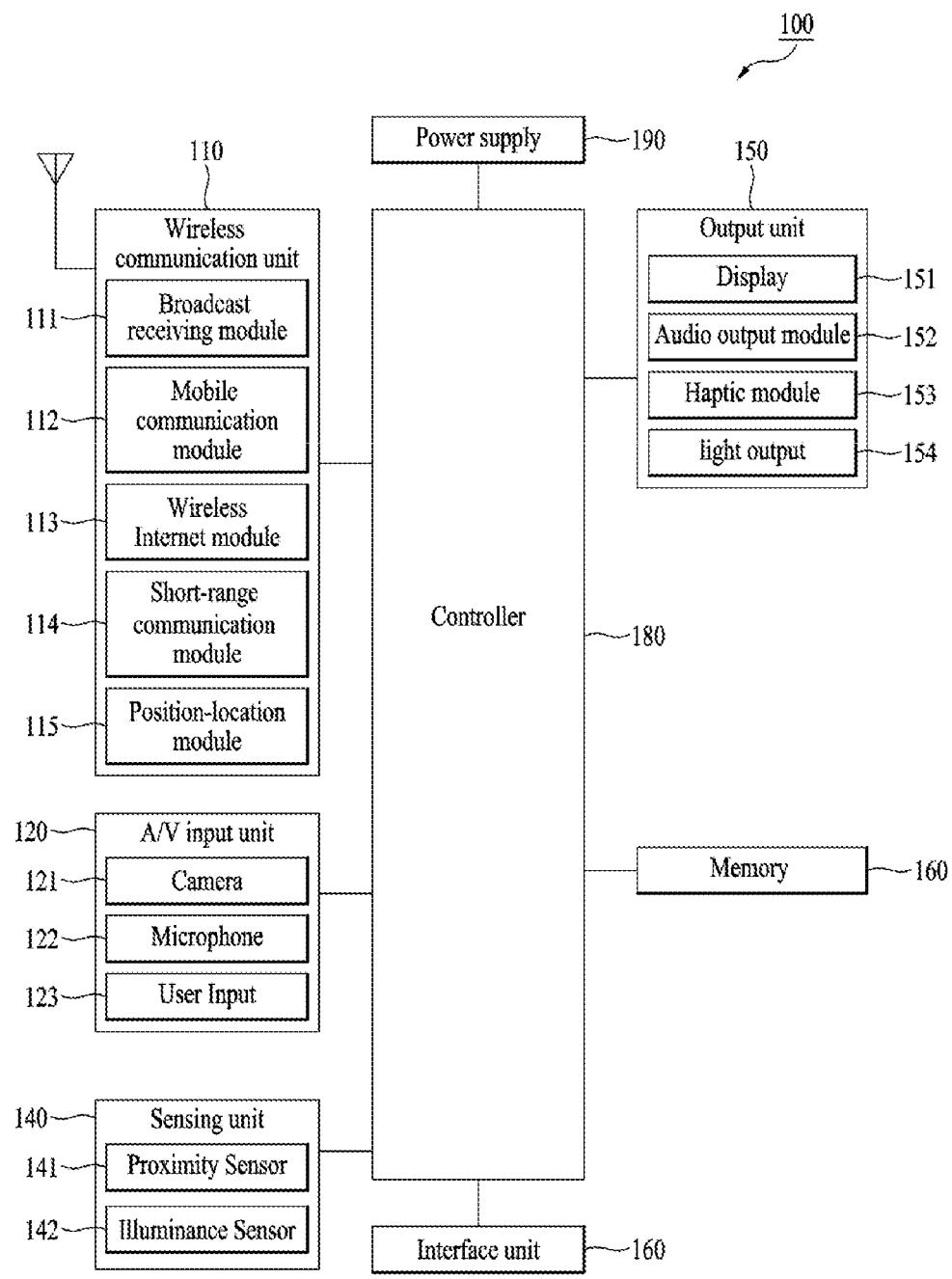

[FIG. 1b]
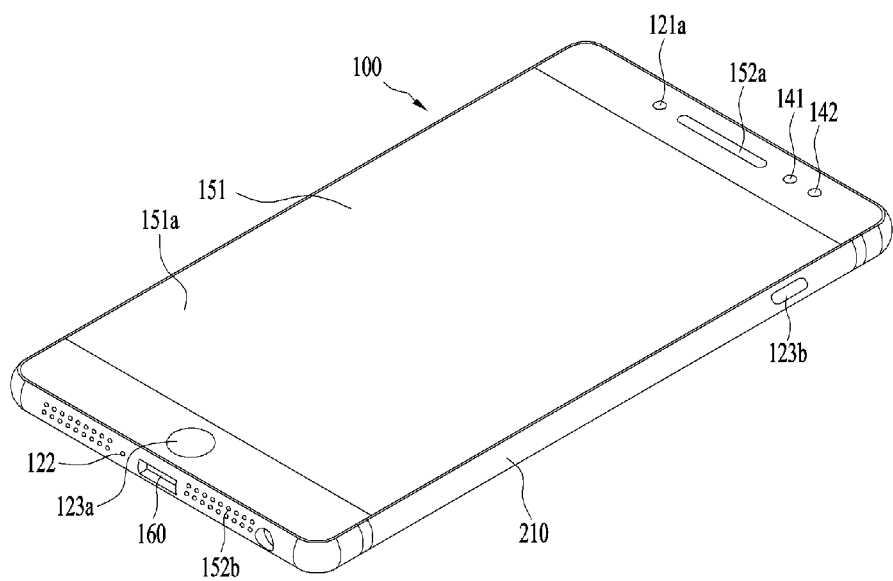
[FIG. 1c]
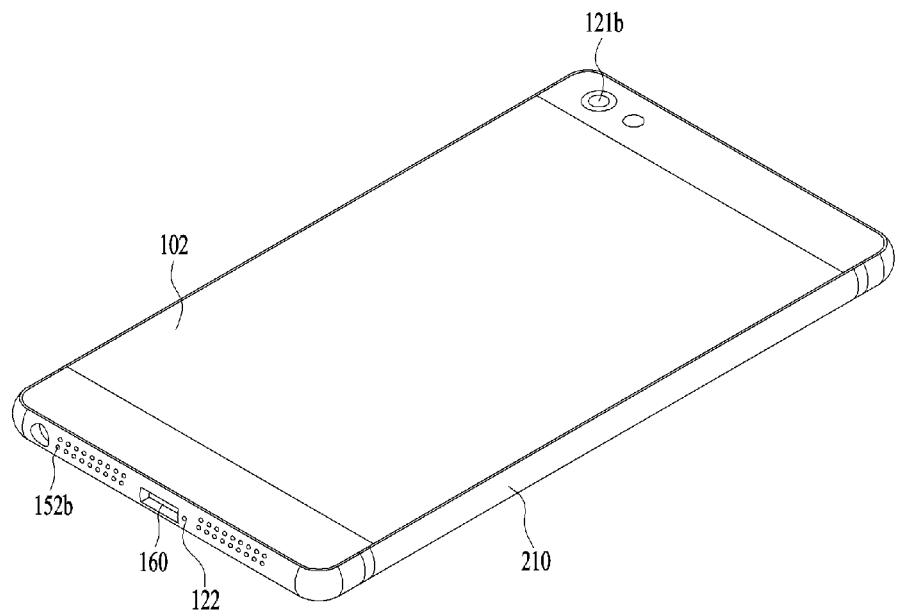

[FIG. 2]
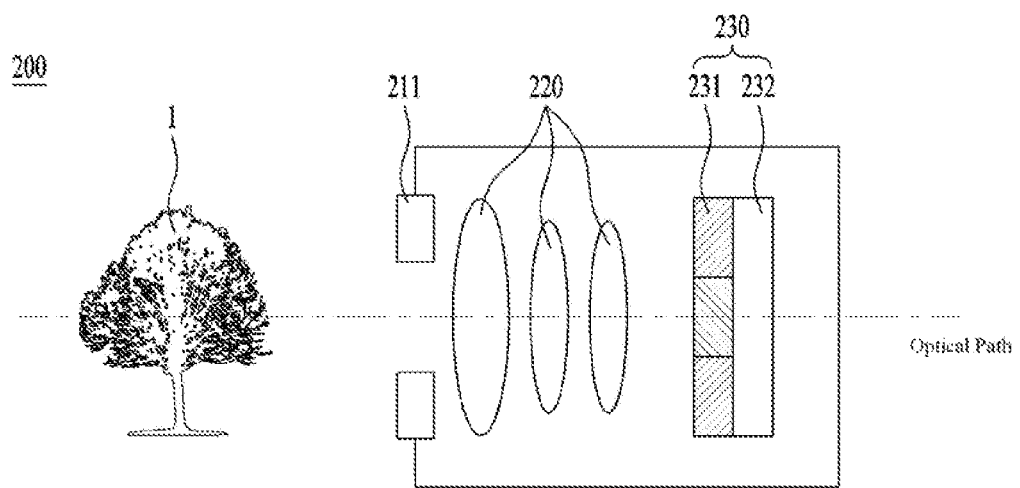

[FIG. 3]
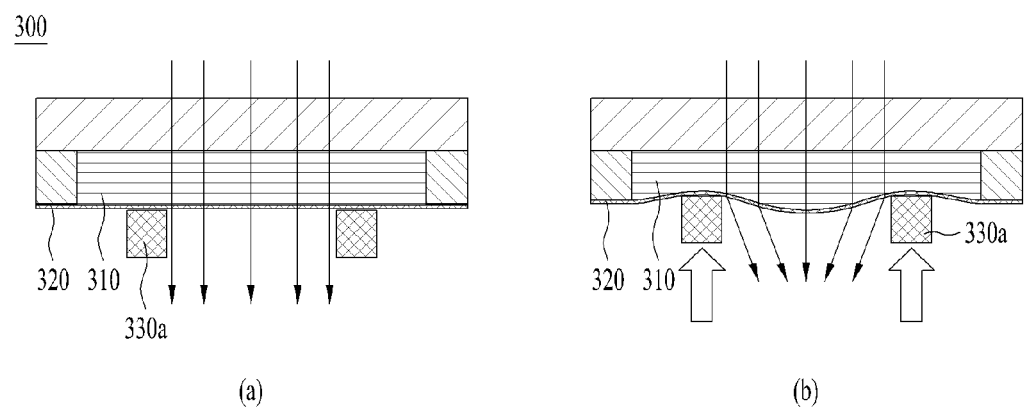
(a)  (b)

[FIG. 4]
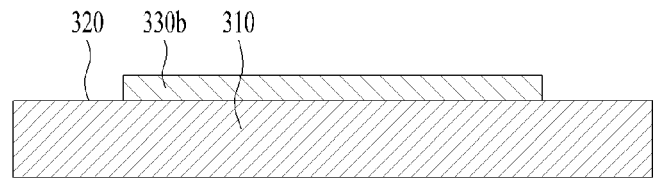
(a)
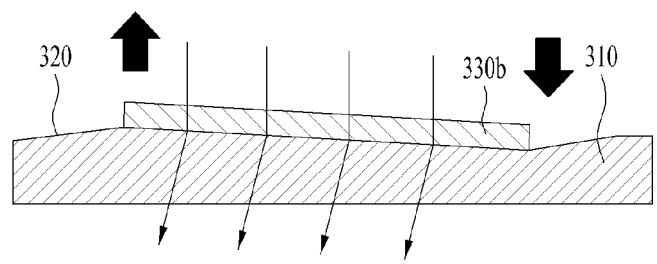
(b)
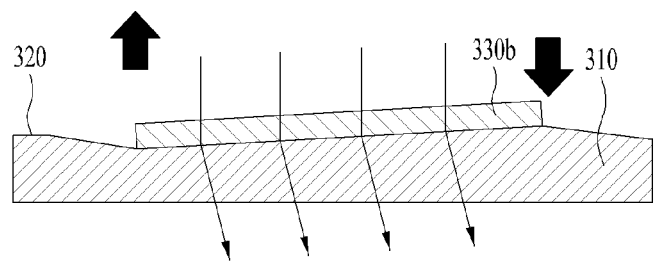
(c)

[FIG. 5]
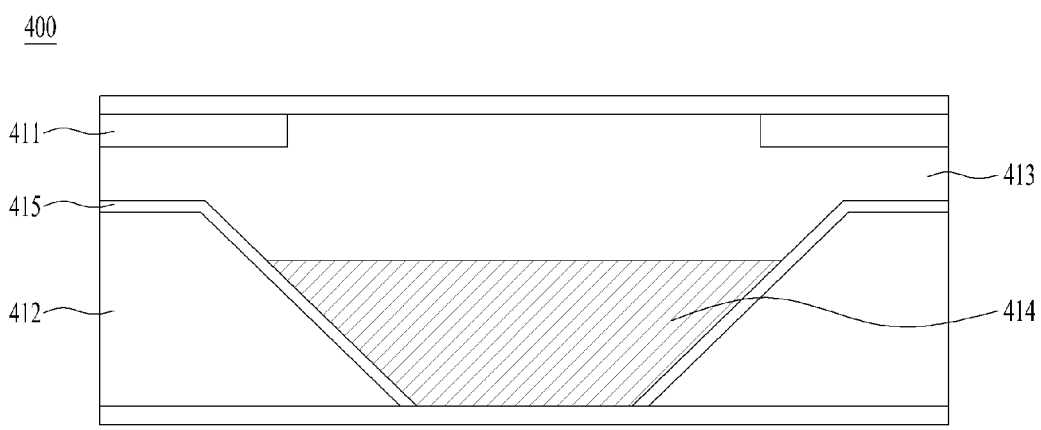

[FIG. 6]
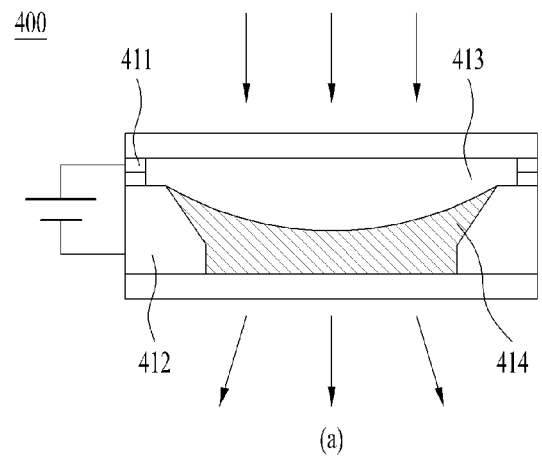
(a)
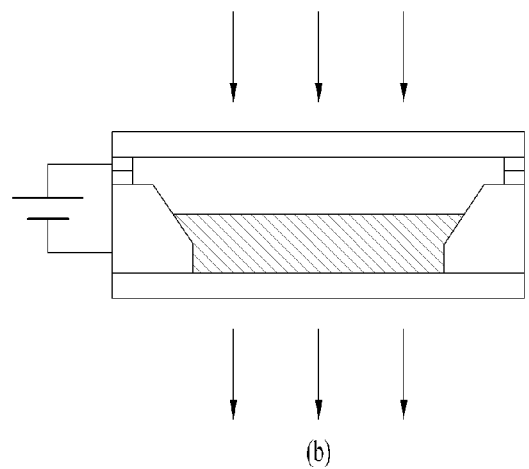
(b)
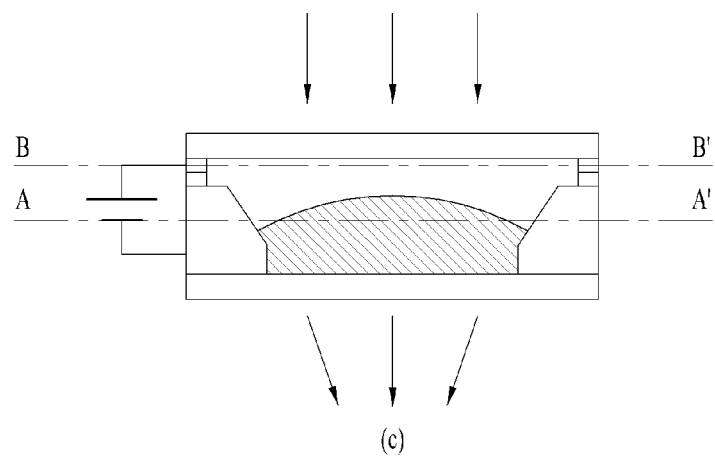
(c)

[FIG. 7]
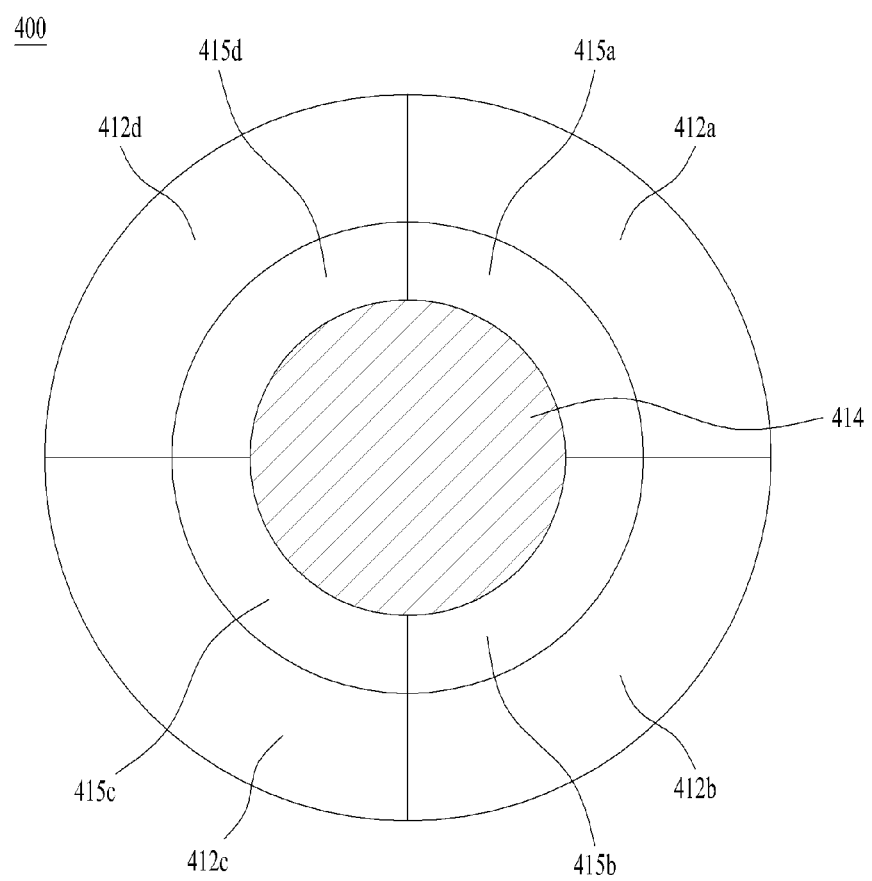

[FIG. 8]
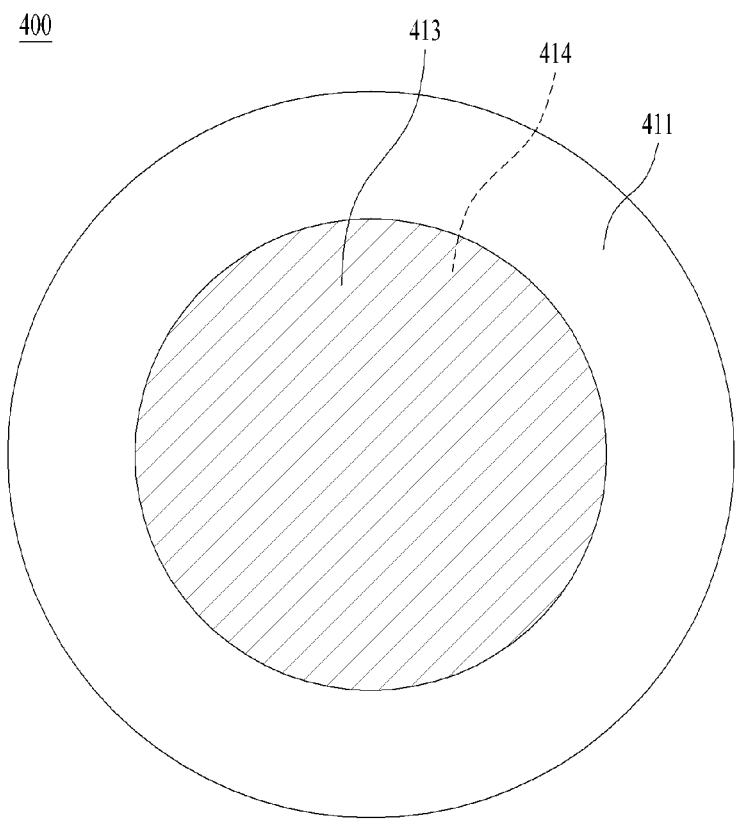

[FIG. 9]
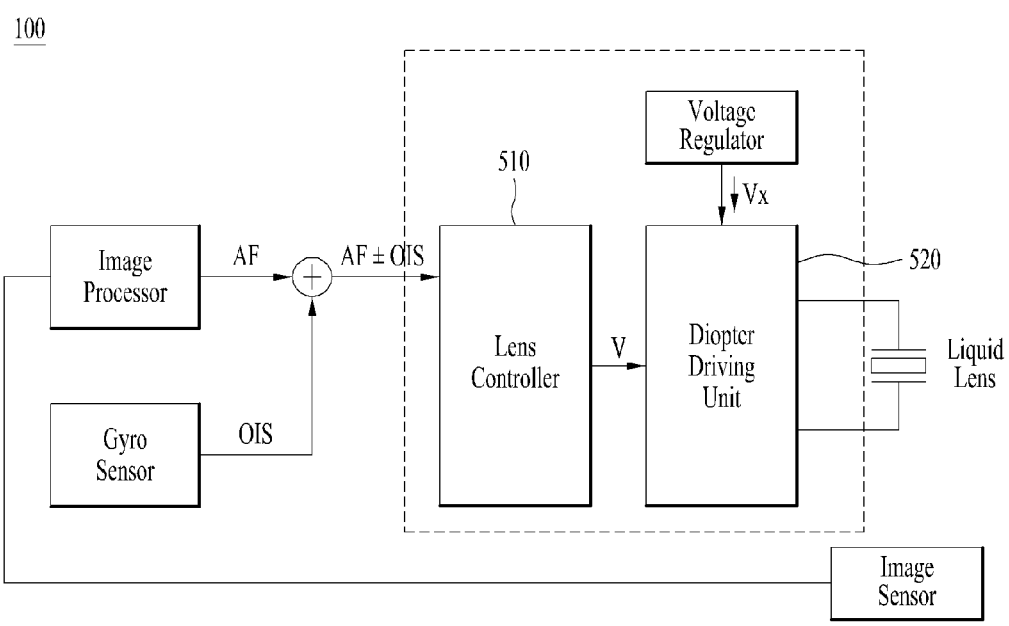

[FIG. 10]
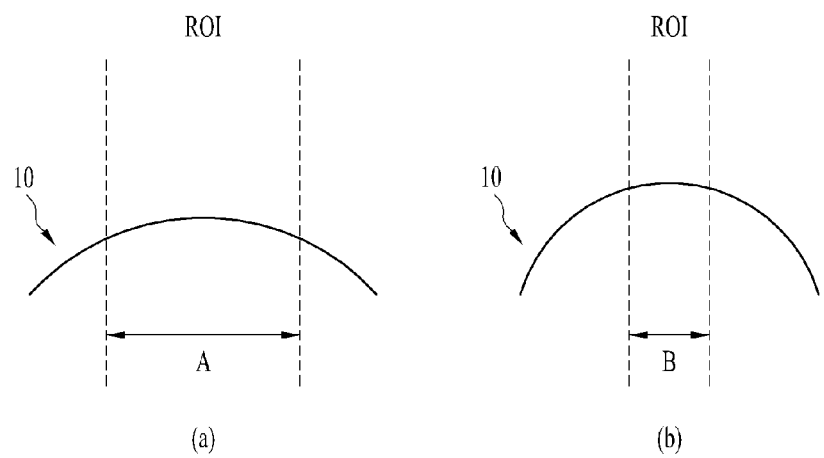

[FIG. 11]
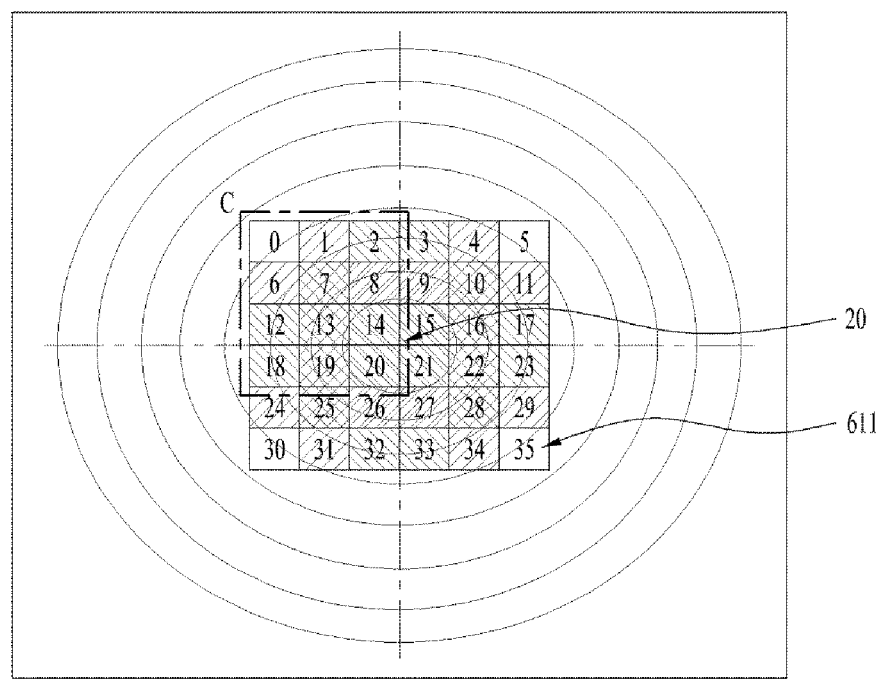

[FIG. 12]
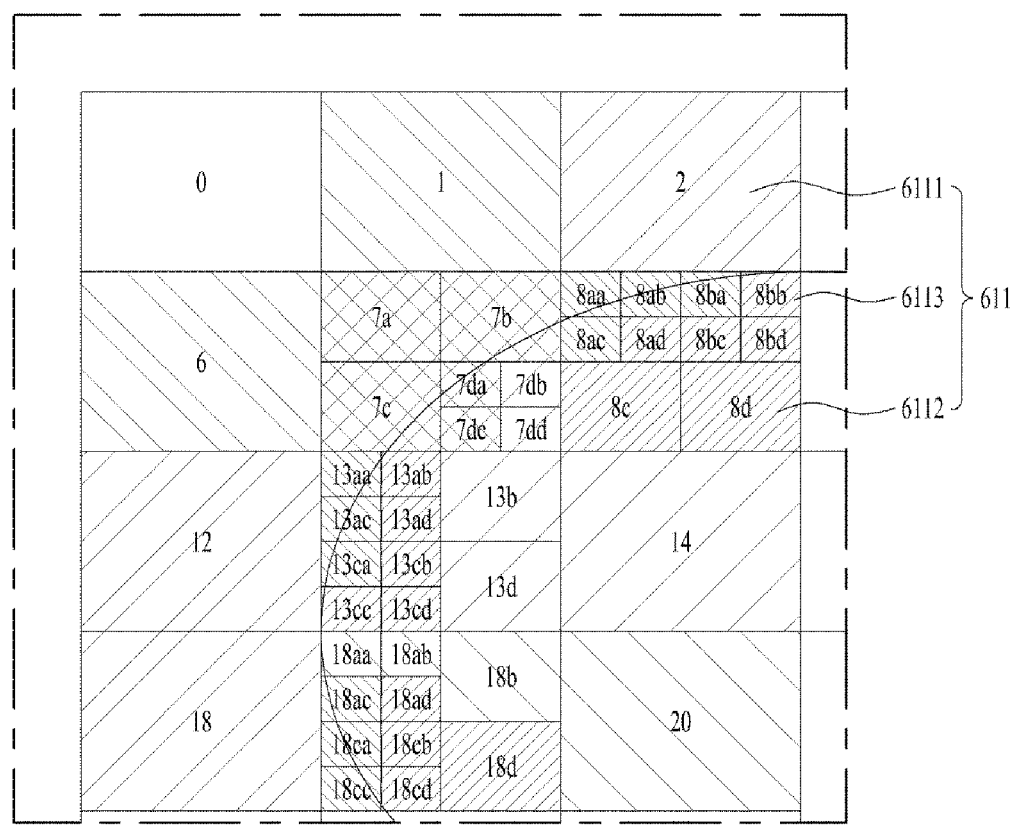

[FIG. 13]
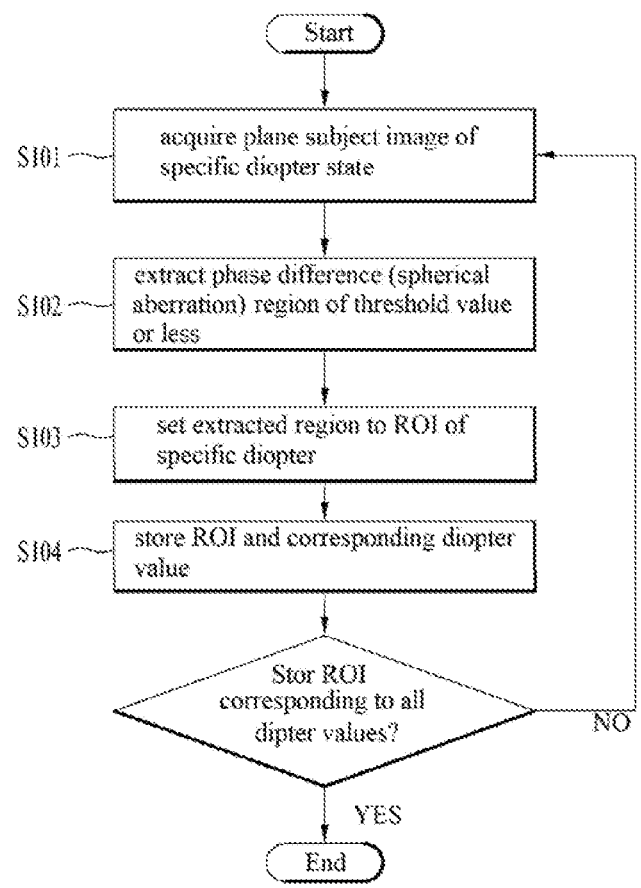

[FIG. 14]
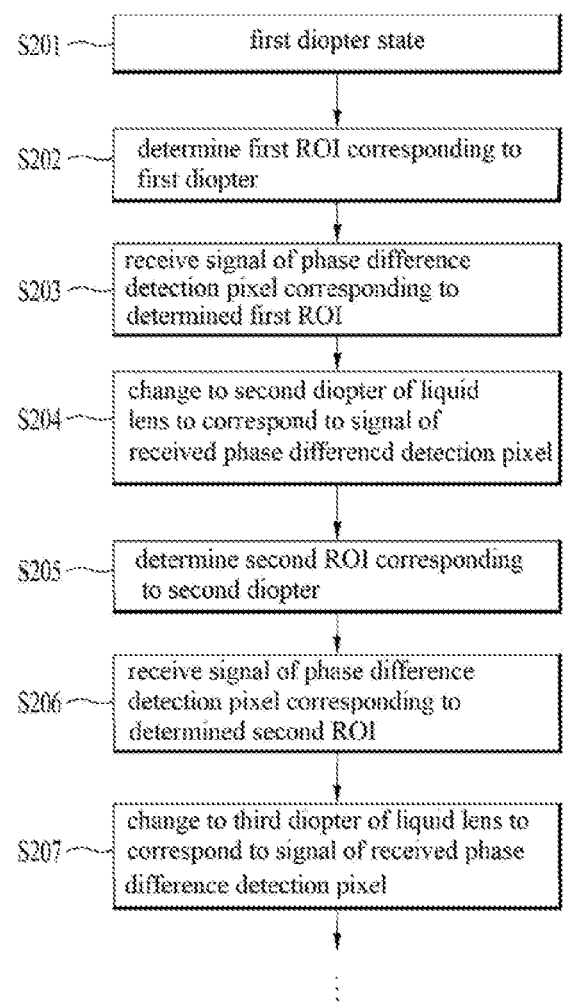

OPTICAL DEVICE

CROSS-REFERENCE TO RELATED APPLICATIONS

This application is the National Stage filing under 35 U.S.C. 371 of International Application No. PCT/KR2018/012199, filed on Oct. 16, 2018, which claims the benefit of U.S. Provisional Application No. 62/643,771, filed on Mar. 16, 2018, the contents of which are all hereby incorporated by reference herein in their entirety.

TECHNICAL FIELD

The present disclosure relates to an optical device that uses a liquid lens and enhances image quality by effectively performing an auto focusing or optical image stabilization (OIS) function.

BACKGROUND ART

Attempts to enhance quality of an image acquired in an optical device are continuously ongoing.

In the optical device, two main functions for acquiring an image including a clear subject include auto-focusing and image stabilization. Auto-focusing means that a focal point is automatically focused on a specific subject, and image stabilization means that a case that a clear image is not formed due to shaking of the optical device is minimized, wherein the shaking of the optical device is caused by external noise.

As an example for performing auto-focusing, there is a method for controlling a distance between a lens group and an image sensor. Alternatively, there is a method for changing a focal distance of a lens group by changing a refractive index of at least one lens of the lens group.

An optical image stabilization (OIS) method of image stabilization is embodied by compensating for shaking of the optical device through rotation or translation of at least one lens.

The above functions compensate an optical function by changing a refractive index or refractive direction of at least one lens or lens group.

However, in case of a general glass lens or plastic lens, since it is difficult to change a lens shape, a refractive index or focal distance of each lens is fixed to make flexible action difficult.

Simultaneously with embodying the above functions, a liquid lens of which shape is changed may be considered as a method for overcoming a physical restriction of the aforementioned glass lens or plastic lens.

However, since a surface area of the liquid lens cannot be set as aimed, a problem of spherical aberration occurs. This causes noise in auto-focusing and delays auto-focusing.

DISCLOSURE

Technical Problem

An object of the present disclosure is to solve a problem of spherical aberration occurring in a liquid lens.

Technical Solution

According to one aspect of the present disclosure to achieve the above object, there is provided an optical device comprising a liquid lens having a common electrode at one side and a plurality of individual electrodes at the other side, a diopter driving unit changing a diopter of the liquid lens by applying a current to the common electrode and the individual electrodes, an image sensor receiving light that has passed through the liquid lens and including a plurality of phase difference detection pixels, and a lens controller determining a region of interest (ROI) of the image sensor in accordance with the diopter of the liquid lens and receiving a signal of the phase difference detection pixel corresponding to the determined ROI.

Also, according to another aspect of the present disclosure, the lens controller controls the diopter driving unit to change the diopter of the liquid lens to correspond to the signal of the received phase difference detection pixel.

Also, according to another aspect of the present disclosure, the optical device further comprises a memory in which an ROI based on the diopter is recorded, wherein the lens controller receives diopter information of the liquid lens and reads out the ROI corresponding to the received diopter from the memory and determines the ROI.

Also, according to another aspect of the present disclosure, the lens controller reads out the ROI corresponding to the changed diopter to determine the ROI, again receives the signal of the phase difference detection pixel corresponding to the determined ROI, and controls the diopter driving unit to again change the diopter of the liquid lens to correspond to the signal of the again received phase difference detection pixel.

Also, according to another aspect of the present disclosure, the lens controller allows the diopter driving unit to end change of the diopter of the liquid lens if the diopter is changed preset times.

Also, according to another aspect of the present disclosure, the lens controller allows the diopter driving unit to end change of the diopter if a ratio of ROI determined after previously determined ROI is a threshold value or more.

Also, according to another aspect of the present disclosure, the lens controller determines a middle ROI corresponding to a middle diopter having a specific value between the diopter before the change and the diopter after the change when the diopter of the liquid lens is changed.

Also, according to another aspect of the present disclosure, a size of an image acquired by the image sensor is greater than the ROI.

Also, according to another aspect of the present disclosure, the image sensor is a dual phase difference detection scheme.

Also, according to another aspect of the present disclosure, there is provided an optical device comprising a liquid lens having a common electrode at one side and a plurality of individual electrodes at the other side, the optical device comprising a phase-difference acquisition unit acquiring phase differences for a plurality of phase difference detection pixels in a state of a specific diopter of the liquid lens, a region detection unit extracting at least one point corresponding to a phase difference of a threshold value or less among the acquired phase differences for the plurality of points, and a setup unit setting at least one extracted point to ROI of the specific diopter.

Also, according to another aspect of the present disclosure, the phase difference is performed for a plane subject.

Also, according to another aspect of the present disclosure, the optical device further comprises a memory storing the specific diopter and the ROI set for the specific diopter.

Also, according to another aspect of the present disclosure, the setup unit sets a circle region having a distance from an optical path center of the at least one point to a point farthest therefrom, as a radius to the ROI.

Advantageous Effects

Advantageous effects of the optical device according to the present disclosure will be described as follows.

According to at least one of the embodiments of the present disclosure, auto-focusing and optical image stabilization may be embodied by a simple structure.

Also, according to at least one of the embodiments of the present disclosure, speed and exactness in auto-focusing may be enhanced in the optical device comprising a liquid lens.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 1a is a block diagram illustrating an optical device according to the present disclosure.

FIGS. 1b and 1c are conceptual views illustrating an example of an optical device according to the present disclosure, which is viewed in different directions.

FIG. 2 is a conceptual view illustrating a section of an optical device according to the present disclosure.

FIGS. 3 and 4 illustrate shapes of a membrane liquid lens according to the present disclosure.

FIG. 5 is a conceptual view illustrating a section of an electro wetting liquid lens.

FIG. 6 is a conceptual view illustrating a section per voltage of an electro wetting liquid lens according to the present disclosure.

FIG. 7 is a conceptual view illustrating a section taken along line A-A' of FIG. 6(c).

FIG. 8 is a conceptual view illustrating a section taken along line B-B' of FIG. 6(c).

FIG. 9 is a driving block view of an optical device comprising an electro wetting liquid lens according to the present disclosure.

FIG. 10 is a conceptual view illustrating a section of a liquid lens according to the present disclosure.

FIG. 11 is a schematic view illustrating an example of a pixel region of an image sensor acquired by an optical device according to the present disclosure.

FIG. 12 illustrates a region C of FIG. 11.

FIG. 13 is a conceptual view illustrating an optical device based on ROI setup method according to the present disclosure.

FIG. 14 is a conceptual view illustrating an optical device based on ROI setup method according to the present disclosure.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C. FIG. 1A is a block diagram of a mobile terminal in accordance with the present disclosure, FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof. The sensing unit 140 is typically implemented using one or more sensors configured to sense internal information of the mobile terminal, the surrounding environment of the mobile terminal, user information, and the like. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may be operated cooperatively to embody an operation, control or a control method of the mobile terminal 100 in accordance with various embodiments of the present disclosure, which will be described hereinafter. Also, the operation, control or control method of the mobile terminal 100 may be embodied on the mobile terminal 100 by driving of one or more application programs stored in the memory 170.

The input unit 120 may be configured to permit various types of input to the mobile terminal 120. Examples of such input include audio, image, video, data, and user input. Image and video input is often obtained using one or more cameras 121.

The camera 121 may be a part of the mobile terminal 100 of the present disclosure, or may be a component that includes the mobile terminal 100. That is, the camera 121 and the mobile terminal 100 of the present disclosure may include at least some common features or components.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen.

The proximity sensor 141 may sense proximity touch, and proximity touch patterns (for example, distance, direction, speed, time, position, moving status, and the like).

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

In this case, the terminal body may be understood as a concept indicating the mobile terminal 100 which is considered as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

An input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be movable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

FIG. 2 is a conceptual view illustrating a section of an optical device 100 according to the present disclosure.

Light reflected or emitted from the subject 1 is refracted by passing through at least one lens 220. The light refracted by passing through the lens 220 reaches the image sensor 230.

The image sensor 230 includes an RGB filter 231 for sensing RGB, and a sensor array 232 converting an optical signal to an electric signal.

The image sensor 230 includes masks for detection a phase difference, on or below the RGB filter 231.

An aperture 211 is located on a point prior to the lens 220 on the optical path to control the amount of light reaching the lens 220 and the image sensor 230.

An image processor may generate RGB image based on the electric signal obtained from the image sensor (not shown).

At this time, in the case that a shape of the lens 220 is fixed to a glass lens or a plastic lens so as not to change a refractive index, there are many restrictions in performing functions such as auto-focusing and image stabilization.

To solve this, an optical device 100 comprising a liquid lens of which shape is changed may be provided.

The liquid lens may be categorized into a membrane liquid lens deformed in accordance with an external physical pressurization, and an electro wetting liquid lens deformed using an electric mutual action. A detailed description regarding this lens will be given later.

FIGS. 3 and 4 illustrate shapes of a membrane liquid lens 300 according to the present disclosure.

As described above, the membrane liquid lens 300 is characterized in that its refractive level is changed by arrangement of liquid changed by a physical pressurization.

The membrane liquid lens 300 includes a fluid liquid 310 and a passivation film 320 covering at least one surface of the liquid to protect the liquid and forming a boundary of shape deformation of the membrane liquid lens 300.

A shaper 330 serves to deform and maintain the shape of the membrane liquid lens 300 by pressurizing at least one region of the passivation film 320 of the membrane liquid lens 300.

The shaper 330 may have a shape different depending on its purpose of use.

FIG. 3 illustrates a membrane liquid lens 300 comprising a ring shaped shaper 330*a*, and FIG. 4 illustrates a membrane liquid lens 300 comprising a plate shaped shaper 330*b*.

The ring shaped shaper 330*a* may control a refractive index and a focal distance of the membrane liquid lens 300 by pressurizing the passivation film 320 of the membrane liquid lens 300 and controlling the pressurizing level.

The plate shaped shaper 330*b* which is another example of the shaper 330 may control a refractive index and a focal distance of the membrane liquid lens 300 by controlling a slope. Particularly, if the plate shaped shaper 330b is used, it is advantageous that a refractive direction may easily be controlled.

FIG. 5 is a conceptual view illustrating a section of an electro wetting liquid lens 400.

Unlike the membrane liquid lens, the electro wetting liquid lens 400 controls its shape by generating a potential difference to deform electronic array of a material.

The electro wetting lens 400 includes an upper electrode 411 and a lower electrode 412.

A current may flow to the upper electrode 411 and the lower electrode 412 to generate a potential difference. At least one of the upper electrode 411 and the lower electrode 412 may include a plurality of terminals. Particularly, the lower electrode 412 may include a plurality of terminals with respect to a cross-section of the liquid lens. A detailed description of the lower electrode 412 will be given later.

As a current flows to the upper electrode 411 or the lower electrode 412, electronic array of a conductive solution 413 is changed. As the electronic array of the conductive solution 413 is changed, a shape of the conductive solution 413 is changed by mutual action between electrons.

A liquid 414 has a specific shape by relatively changing an array inside a boundary of the electro wetting lens 400 by shape deformation of the conductive solution 413. The liquid 414 serves to directly refract light. As the shape of the liquid 414 is changed, a refractive index, a focal distance or a refractive direction is deformed.

The shape of the upper electrode 411 and the lower electrode 412 affects the shape of the conductive solution 413 and the liquid 414. For example, if the liquid 414 is provided between spaced portions of the lower electrode 412 and the lower electrode 412 has a slope of which left and right width becomes narrow toward an upper portion, the largest force is applied to an edge of the liquid 414, whereby a shape of the liquid 414 has a curve like a lens shape.

A non-conductive layer 415 is provided on an upper surface of the lower electrode 412 to prevent a current from directly flowing between the conductive solution 413 and the lower electrode 412.

FIG. 6 is a conceptual view illustrating a section per voltage of an electro wetting liquid lens 400 according to the present disclosure.

As described above, the shape of the liquid 414 is changed in accordance with a potential difference between the upper electrode 411 and the lower electrode 412.

In FIGS. 6(a), 6(b) and 6(c), a potential difference between the upper electrode 411 and the lower electrode 412 is gradually increased. From the shape of FIG. 6(a) to the shape of FIG. 6(c), the shape of the liquid lens 414 is changed from a concave lens to a convex lens to have a feature of the convex lens.

That is, as the potential difference of the upper electrode 411 and the lower electrode 412 is increased, a diopter of the electro wetting liquid lens 400 is increased. This means that a lens curvature is reduced as the potential difference is increased when the liquid 414 is a state of a concave lens, and means that a lens curvature is increased as the potential difference is increased when the liquid 414 is a state of a convex lens.

The curvature or diopter of the electro wetting liquid lens 400 may be changed depending on a pulse width applied to each of the electrodes 411 and 412 or a difference in the time when each pulse is applied.

FIG. 7 is a conceptual view illustrating a section taken along line A-A' of FIG. 6(c).

The lower electrode 412 may include a plurality of electrodes 412a, 412b, 412c and 412d that may sequentially be arranged along an outer circumferential surface around the conductive solution 413 or the liquid 414.

The plurality of electrodes 412a, 412b, 412c and 412d mean that different voltages may be applied. This means that the shape of the lens may be changed to various shapes in accordance with the aforementioned principle. In other words, different potential differences are applied to the plurality of electrodes 412a, 412b, 412c and 412d, whereby a portion where a high potential difference occurs is formed at a position where the boundary of the liquid 414 is low, and a portion where a low potential difference occurs is formed at a position where the boundary of the liquid 414 is high.

If the lower electrode 412 includes a plurality of electrodes, the non-conductive layers 415 may be provided as much as the number of the plurality of lower electrodes 412.

FIG. 8 is a conceptual view illustrating a section taken along line B-B' of FIG. 6(c).

The upper electrode 411 may be comprised of a single electrode which is not identified, unlike the lower electrode 412. The lower electrode 412 serves as a relative object of the plurality of lower electrodes 412a, 412b, 412c and 412d that form different potential differences.

FIG. 9 is a driving block view of an optical device 100 comprising an electro wetting liquid lens 400 according to the present disclosure.

A lens controller 510 specifies a voltage value or pulse width corresponding to a diopter value of the electro wetting liquid lens 400, which is aimed, to allow a diopter driving unit 520 to apply a voltage to the electro wetting liquid lens 400.

FIG. 10 is a conceptual view illustrating a section of a liquid lens according to the present disclosure.

The following embodiments may be applied without being limited to any one of the aforementioned membrane liquid lens and electro wetting liquid lens. Therefore, the above liquid lenses will collectively be referred to as the liquid lens 10.

A surface shape of the liquid lens 10 is changed when the focal distance is changed as the diopter is changed. The membrane or electro wetting liquid lens 10 may control a shape of a certain region of a surface but cannot control a shape of an entire region of the surface as aimed.

Therefore, spherical aberration relatively greater than spherical aberration of the glass or plastic lens designed to correspond to a specific focal distance.

Spherical Aberration generates noise in performing auto-focusing changing the diopter. In order to minimize noise in the process of auto-focusing, it is required to minimize a region where spherical aberration occurs.

For example, if Phase-difference Detection Auto Focusing is performed, computation may be performed that the focal distance is not suitable, by the region where spherical aberration occurs, even though the focal distance is suitable. Alternatively, computation may be performed that the focal distance is suitable, by the region where spherical aberration occurs, even though the focal distance is not suitable.

Therefore, a region of interest (ROI) needs to be set differently depending on the diopter of the liquid lens 10. In this case, the ROI means a pixel region on the image sensor used for diopter change for auto-focusing.

That is, the ROI of the present disclosure is a concept related to the pixel region used for auto-focusing, and is identified from the pixel region of the image actually acquired by the subject. Therefore, the size of the image acquired by capturing the subject may be greater than the ROI.

The ROI may include a pixel region having a spherical aberration value less than a threshold value.

For example, if the liquid lens 10 is formed of the diopter like FIG. 10(*a*), a region where the spherical aberration is a specific value or less may be referred to as A. The lens controller may consider only a region A during diopter change for auto-focusing.

On the other hand, if the liquid lens 10 is formed of the diopter like FIG. 10(*b*), a region where the spherical aberration is a specific value or less may be referred to as B. The lens controller sets the region B to the ROI.

That is, as the diopter of the liquid lens 10 is changed, the ROI is changed, whereby it is required to perform auto-focusing.

FIG. 11 is a schematic view illustrating an example of a pixel region of an image sensor acquired by an optical device according to the present disclosure.

The case that fixed auto-focusing is performed based on a lens center region, that is the center of the optical path is defined as Continuous Auto Focusing (hereinafter, referred to as Continuous AF). The embodiment related to auto-focusing, which will be described later, will be described based on Continuous AF unless otherwise mentioned.

In Continuous AF, spherical aberration occurs in an optical path center 20 within a minimum range, and is increased toward an outside.

At this time, the same spherical aberration will be applied to points having the same distance from the optical path center.

An image pixel region may be divided into a plurality of regions 611 to set a region, in which spherical aberration is a specific value or less, to the ROI. At this time, sizes of the plurality of regions 611 which are divided may be equal to one another.

A phase difference value of one divided region 611 may mean an average of phase difference values for a plurality of pixels (not shown) included in the corresponding divided region. Spherical aberration is great if the phase difference is great, two concepts of phase difference and spherical aberration will be described without identification in the present disclosure.

The lens controller may set regions corresponding to spherical aberration of a specific value or less to the ROI by computing spherical aberration for each of the plurality of divided regions 611.

FIG. 12 illustrates a region C of FIG. 11.

As described above, spherical aberration is distributed in the form of wave source. On the other hand, if the ROI is generated based on the plurality of divided regions of the same size as shown in FIG. 11, the divided regions are configured in a square shape or rectangular shape. For this reason, a region where the ROI is not set occurs due to a shape feature even though a condition of spherical aberration is satisfied.

In order to solve this, divided regions 6112 and 6113 smaller than the existing divided region 6111 may be added to form the ROI.

For example, if the ROI is configured in a size of the initial divided region 6110, the divided regions 14 and 20 may be included in the ROI, and some pixels cannot be included in the divided regions 7, 8, 13 and 18. Therefore, the divided region 6112 corresponding to ¼ size of the divided regions 14 and 20 may be formed to be added to the ROI. 8*c*, 8*d*, 13*b*, 13*d*, 18*b* and 18*d* may be added to the ROI by additional division of ¼. Moreover, the divided regions may additionally be divided to add the satisfied region 6113 to the ROI, whereby the ROI may be set most effectively.

Effective setup of the ROI enhances exactness in Phase-difference Detection and Contrast Value Detection.

FIG. 13 is a conceptual view illustrating an optical device based on ROI setup method according to the present disclosure.

A procedure of acquiring ROI based on the diopter may be implemented as follows. In this embodiment, acquisition of spherical aberration through phase-difference detection will be described as an example.

First of all, a phase-difference acquisition unit detects a phase difference per region of the image sensor by sensing an image in a state of a specific diopter with respect to a subject made of a plane, that is, the same distance (S101).

In case of ideal lenses having no spherical aberration due to a plane of the same distance, the same phase difference should be formed for the lenses. However, a different phase difference, that is, spherical aberration occurs in view of characteristics of the liquid lens for the aforementioned reason. In this case, the phase difference will be more increased toward the outside from the optical path center.

Afterwards, a region extractor extracts a region that satisfies a threshold value or less from the phase difference per detected region (S102), and a setup unit sets the extracted region to the ROI of the corresponding specific diopter (S103).

A memory stores the corresponding diopter value and the set ROI therein (S104). The above steps may be repeated for all the diopter values, that is, interested diopter values, whereby ROI based on each state of the plurality of diopters of the liquid lens may be databased.

The memory may record or store ROI data based on the diopter value obtained by the above method.

The lens controller may use the ROI data based on the diopter value stored in the memory during a capturing step. A detailed procedure will be described later.

FIG. 14 is a conceptual view illustrating an optical device based on ROI setup method according to the present disclosure.

As described above, a variable ROI may be applied to all of the liquid lenses such as the membrane liquid lens and the electro wetting liquid lens. The electro wetting lens may have a common electrode at one side, and may have a plurality of individual electrodes at the other sides. The aforementioned upper electrode may correspond to the common electrode, and the aforementioned lower electrode may corresponding to the plurality of individual electrodes.

The image sensor acquires an image for each pixel by receiving light that has passed through the liquid lens. At this time, auto-focusing may be performed through phase-difference detection pixels. The phase-difference detection pixels may be provided over a full region of the image sensor, or may be provided in some pixels. The former case will be referred to as a Dual PD scheme, and the latter case will be referred to as a PDAF scheme.

The lens controller may determine the ROI based on the diopter of the liquid lens. For example, if a current diopter is a first diopter (S201), the lens controller determines a first ROI corresponding to a first diopter value on data (S202). At this time, the lens controller may determine the ROI by reading out data stored in the memory.

The lens controller may receive only a signal corresponding to a phase difference value within the determined ROI among the phase differences detected by the phase difference detection pixels (S203).

A diopter driving unit changes the current diopter to a second diopter based on the signal of the phase difference detection pixel received by the lens controller among the signals of the phase difference detection pixels (S204). However, since the second diopter performs auto-focusing based on the first ROI, it may not be considered that auto-focusing has been completely performed.

Therefore, the lens controller determines a second ROI corresponding to the second diopter (S205), and receives a signal of a phase difference detection pixel corresponding to the determined second ROI (S206).

The diopter driving unit may again perform auto-focusing based on the second diopter. The lens controller determines the second ROI corresponding to the second diopter which is the current diopter (S205).

The lens controller may receive only a signal corresponding to a phase difference value within the determined second ROI among the phase differences detected by the phase difference detection pixels (S206).

The diopter driving unit again changes the current diopter to a third diopter for auto-focusing based on the signal of the phase difference detection pixel received by the lens controller among the signals of the phase difference detection pixels (S207).

In this way, the first diopter may become the second diopter, and the second diopter may again become the third diopter. The amount of change from the second diopter to the third diopter is reduced more remarkably than the amount of change from the first diopter to the second diopter. This means convergence to the focal distance suitable for the subject.

The above steps may be repeated to perform optimal auto-focusing suitable for the subject, and the ROI is optimally changed, whereby error caused by occurrence of noise or auto-focusing delay may be minimized.

The above steps should be repeated infinitely to perform theoretically perfect auto-focusing but sufficient exactness may be obtained if the above steps are repeated several times.

A reference for ending repetition of the above steps may be performed in various ways.

For example, if auto-focusing of preset times is repeated, the lens controller may end the repetition. That is, if the diopter of the liquid lens is changed preset times, the lens controller may allow the diopter to end the change of the diopter.

Alternatively, if a previous ROI is compared with the current ROI and then a change rate is within a threshold range, the lens controller may end auto-focusing. That is, if a ratio of the ROI set after the previous ROI is a threshold value or more, the lens controller may allow the diopter driving unit to end change of the diopter.

In addition to the above algorithm, the ROI prior to actual change of the diopter may repeatedly be applied to obtain the diopter to be changed.

For example, when a value to be changed to the second diopter is obtained using the first ROI at the state of the first diopter, the diopter driving unit may computer the current diopter to the third diopter by computing the third diopter based on the second ROI corresponding to the computed second diopter without changing to the state of the second diopter.

However, if the ROI is changed before the diopter is actually changed, since computation may be repeated infinitely, computation may be performed until the change rate of the ROI change is within a preset value, and the current diopter may be changed to the diopter value obtained by computation.

Alternatively, the current diopter may directly be changed to a diopter value obtained by repeated computation of ROI as much as a given number of times.

As the case may be, ROI compensated during the procedure of changing to next diopter may be set to obtain the diopter value.

For example, in the procedure of changing the state of the first diopter to the second diopter using the first ROI, if the second diopter value is obtained based on the first ROI, the diopter driving unit may determine a middle ROI which is a middle region of the first ROI and the second ROI and change the diopter of the liquid lens without directly changing the liquid lens to the second diopter.

It will be apparent to those skilled in the art that the present specification can be embodied in other specific forms without departing from the spirit and essential characteristics of the specification.

Thus, the above embodiments are to be considered in all respects as illustrative and not restrictive. The scope of the specification should be determined by reasonable interpretation of the appended claims and all change which comes within the equivalent scope of the specification are included in the scope of the specification.

The invention claimed is:

1. An optical device comprising:
a liquid lens having a common electrode at one side and a plurality of individual electrodes at the other side;
a diopter driving unit changing a diopter of the liquid lens by applying a current to the common electrode and the individual electrodes;
an image sensor receiving light that has passed through the liquid lens and including a plurality of phase difference detection pixels; and
a lens controller determining a region of interest (ROI of the image sensor in accordance with the diopter of the liquid lens and receiving a signal of the phase difference detection pixel corresponding to the determined ROI.

2. The optical device of claim 1, wherein the lens controller controls the diopter driving unit to change the diopter of the liquid lens to correspond to the signal of the received phase difference detection pixel.

3. The optical device of claim 2, further comprising a memory in which an ROI based on the diopter is recorded, wherein the lens controller receives diopter information of the liquid lens and reads out the ROI corresponding to the received diopter from the memory and determines the ROI.

4. The optical device of claim 3, wherein the lens controller again reads out the ROI corresponding to the changed diopter to determine the ROI, again receives the signal of the phase difference detection pixel corresponding to the determined ROI, and controls the diopter driving unit to again change the diopter of the liquid lens to correspond to the signal of the again received phase difference detection pixel.

5. The optical device of claim 4, wherein the lens controller allows the diopter driving unit to end change of the diopter of the liquid lens if the diopter is changed preset times.

6. The optical device of claim 4, wherein the lens controller allows the diopter driving unit to end change of the diopter if a ratio of ROI determined after previously determined ROI is a threshold value or more.

7. The optical device of claim 2, wherein the lens controller determines a middle ROI corresponding to a middle diopter having a specific value between the diopter before the change and the diopter after the change when the diopter of the liquid lens is changed.

8. The optical device of claim 1, wherein a size of an image acquired by the image sensor is greater than the ROI.

9. The optical device of claim 1, wherein the image sensor is a dual phase difference detection scheme.

10. An optical device comprising a liquid lens having a common electrode at one side and a plurality of individual electrodes at the other side, the optical device comprising:
- a phase-difference acquisition unit acquiring phase differences for a plurality of phase difference detection pixels in a state of a specific diopter of the liquid lens;
- a region detection unit extracting at least one point corresponding to a phase difference of a threshold value or less among the acquired phase differences for the plurality of points; and
- a setup unit setting at least one extracted point to ROI of the specific diopter.

11. The optical device of claim 10, wherein the phase difference is performed for a plane subject.

12. The optical device of claim 10, further comprising a memory storing the specific diopter and the ROI set for the specific diopter.

13. The optical device of claim 7, wherein the setup unit sets a circle region having a distance from an optical path center of the at least one point to a point farthest therefrom, as a radius to the ROI.

* * * * *